(12) United States Patent
Dunston

(10) Patent No.: US 9,862,230 B2
(45) Date of Patent: Jan. 9, 2018

(54) CHAIR LOCK SYSTEM

(71) Applicant: Barbara Dunston, Henderson, NC (US)

(72) Inventor: Barbara Dunston, Henderson, NC (US)

(*) Notice: Subject to any disclaimer, the term of this patent is extended or adjusted under 35 U.S.C. 154(b) by 18 days.

(21) Appl. No.: 14/946,938

(22) Filed: Nov. 20, 2015

(65) Prior Publication Data
US 2017/0144481 A1    May 25, 2017

(51) Int. Cl.
*A47C 31/00* (2006.01)
*B60B 33/00* (2006.01)
*A47C 7/72* (2006.01)
*A47C 7/00* (2006.01)

(52) U.S. Cl.
CPC .......... *B60B 33/0094* (2013.01); *A47C 7/006* (2013.01); *A47C 7/72* (2013.01); *B60B 33/0081* (2013.01)

(58) Field of Classification Search
CPC ... A45C 5/145; B60B 33/0092; B60B 33/026; A61G 1/0243; A61G 1/0287; A61G 2007/0528; A61G 5/1013; A47C 1/13; A47C 31/126; B64D 11/00155
USPC ...... 297/217.2, 217.3, 217.4; 16/35 R, 18 R, 16/45, 46; 188/1.12
See application file for complete search history.

(56) References Cited

U.S. PATENT DOCUMENTS

| 5,603,517 | A | 2/1997 | Lorman | |
|---|---|---|---|---|
| 6,321,878 | B1 * | 11/2001 | Mobley | A61G 7/00 188/1.12 |
| 6,371,503 | B2 | 4/2002 | Ritchie et al. | |
| 6,532,624 | B1 | 3/2003 | Yang | |
| 6,854,567 | B2 | 2/2005 | Suzuki | |
| 6,854,568 | B2 | 2/2005 | Kun-Tsai | |
| 7,021,707 | B2 * | 4/2006 | Young | B60N 2/002 280/735 |
| 7,378,978 | B2 * | 5/2008 | Cassaday | A47C 1/022 297/217.2 |
| 7,461,897 | B2 * | 12/2008 | Kruse | A61G 5/006 297/217.3 |
| 7,598,881 | B2 * | 10/2009 | Morgan | B60R 21/01534 280/730.2 |
| 7,712,184 | B1 | 5/2010 | Lewis et al. | |
| 7,810,612 | B2 * | 10/2010 | Gray | B60K 7/0007 188/1.12 |
| 7,926,145 | B2 | 4/2011 | Liao | |
| 8,024,101 | B2 * | 9/2011 | Froll | A61G 7/08 180/19.1 |
| 8,185,286 | B2 * | 5/2012 | Ono | B60T 8/1706 180/227 |
| 8,452,508 | B2 * | 5/2013 | Frolik | A61G 7/018 180/19.1 |
| 8,640,832 | B2 * | 2/2014 | Chen | A61G 7/018 16/18 R |
| 8,684,145 | B2 * | 4/2014 | Boukhny | B60B 33/0042 16/35 R |

(Continued)

Primary Examiner — Jose V Chen

(57) ABSTRACT

A chair lock system for inhibiting a chair from rolling when the chair is occupied includes a chair. A plurality of wheels is rotatably coupled to the chair and each of the wheels may roll along a support surface. Each of the wheels is positioned on the base. A locking unit is coupled to the chair and the locking unit inhibits the wheels from rolling along the support surface when the chair is sat upon.

4 Claims, 4 Drawing Sheets

(56) References Cited

U.S. PATENT DOCUMENTS

| | | | | |
|---|---|---|---|---|
| 8,714,646 | B2* | 5/2014 | Cvek | A47C 1/0242 |
| | | | | 297/217.3 |
| 8,783,420 | B2* | 7/2014 | Lai | A45C 5/145 |
| | | | | 188/1.12 |
| 9,168,785 | B2* | 10/2015 | Spektor | B60B 33/0076 |
| 9,266,392 | B2* | 2/2016 | Brondum | B60B 33/0092 |
| 9,409,444 | B2* | 8/2016 | Dayt | B60B 33/0021 |
| 2002/0070590 | A1* | 6/2002 | Carstens | A47C 3/18 |
| | | | | 297/217.3 |
| 2004/0195876 | A1* | 10/2004 | Huiban | A47C 9/002 |
| | | | | 297/217.3 |
| 2005/0178590 | A1* | 8/2005 | Martin-Woodin | A61G 5/1002 |
| | | | | 177/144 |
| 2006/0103192 | A1* | 5/2006 | Norton | B60N 2/002 |
| | | | | 297/217.2 |
| 2010/0037426 | A1 | 2/2010 | Mongelluzzo et al. | |
| 2010/0175222 | A1 | 7/2010 | Fallshaw et al. | |
| 2010/0207434 | A1* | 8/2010 | Kurrasch | A47C 1/0242 |
| | | | | 297/217.2 |
| 2011/0043006 | A1* | 2/2011 | Butt | A47C 7/38 |
| | | | | 297/68 |
| 2011/0162141 | A1* | 7/2011 | Lemire | A61G 7/005 |
| | | | | 5/510 |
| 2011/0197395 | A1 | 8/2011 | Schulte | |
| 2012/0160617 | A1* | 6/2012 | Qi | B60B 33/0078 |
| | | | | 188/1.12 |
| 2015/0123436 | A1* | 5/2015 | Boyer | B60N 2/646 |
| | | | | 297/217.2 |
| 2016/0088948 | A1* | 3/2016 | Boduk | A47C 7/62 |
| | | | | 700/275 |

* cited by examiner

CHAIR LOCK SYSTEM

BACKGROUND OF THE DISCLOSURE

Field of the Disclosure

The disclosure relates to lock devices and more particularly pertains to a new lock device for inhibiting a chair from rolling when the chair is occupied.

SUMMARY OF THE DISCLOSURE

An embodiment of the disclosure meets the needs presented above by generally comprising a chair. A plurality of wheels is rotatably coupled to the chair and each of the wheels may roll along a support surface. Each of the wheels is positioned on the base. A locking unit is coupled to the chair and the locking unit inhibits the wheels from rolling along the support surface when the chair is sat upon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
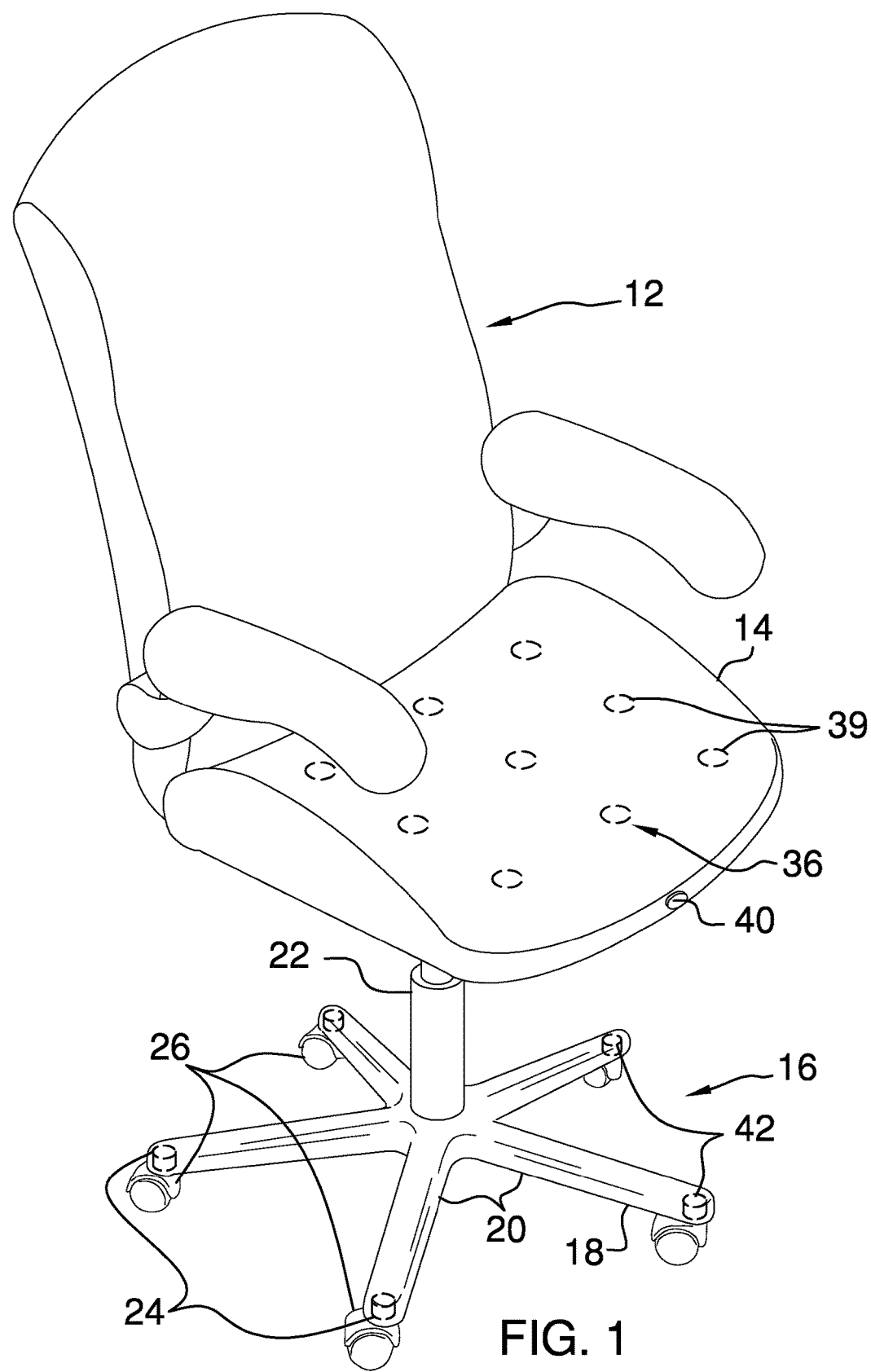
FIG. 1 is a front perspective view of a chair lock system according to an embodiment of the disclosure.
Figure 2:
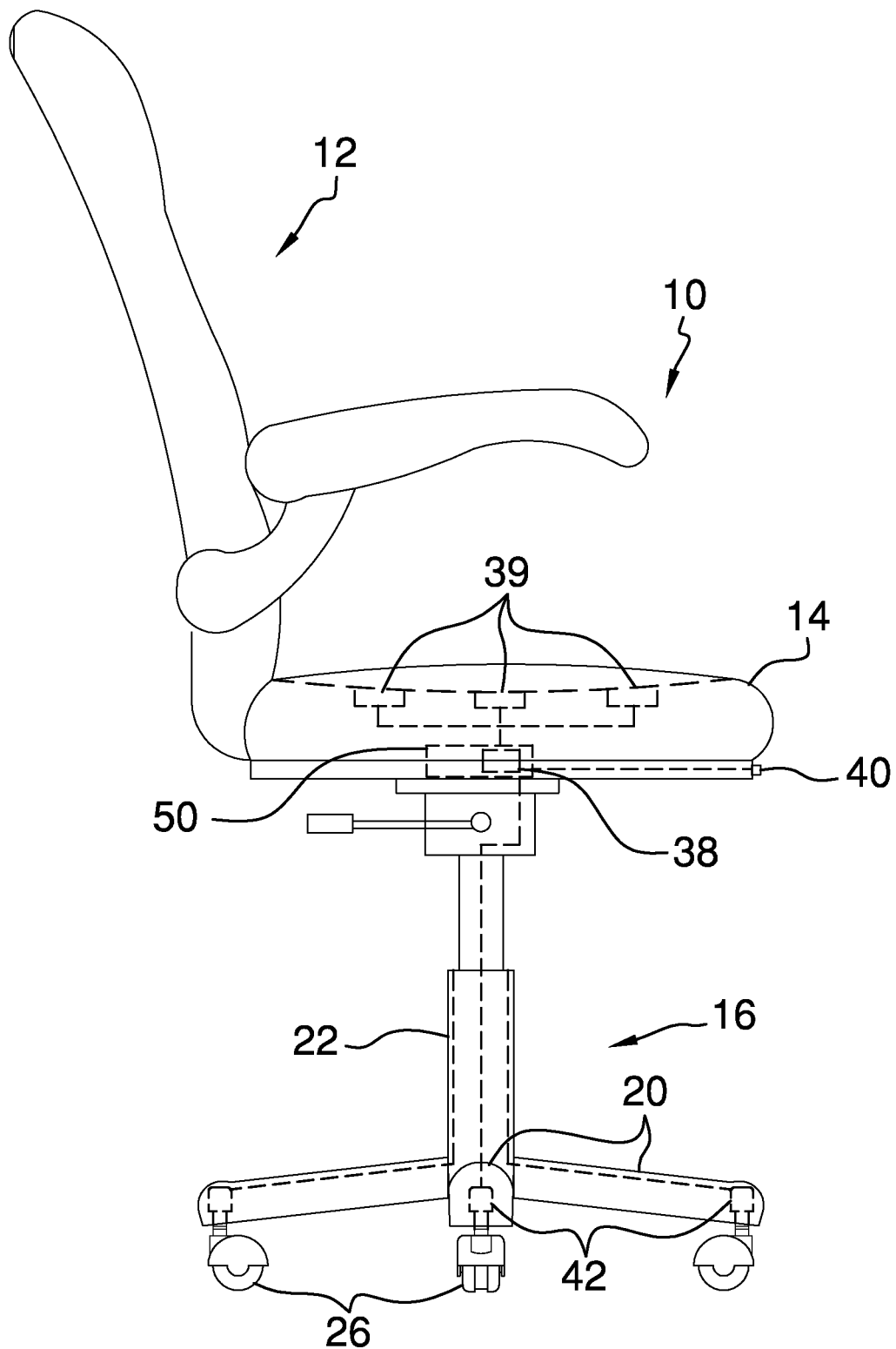
FIG. 2 is a right side view of an embodiment of the disclosure.
Figure 3:
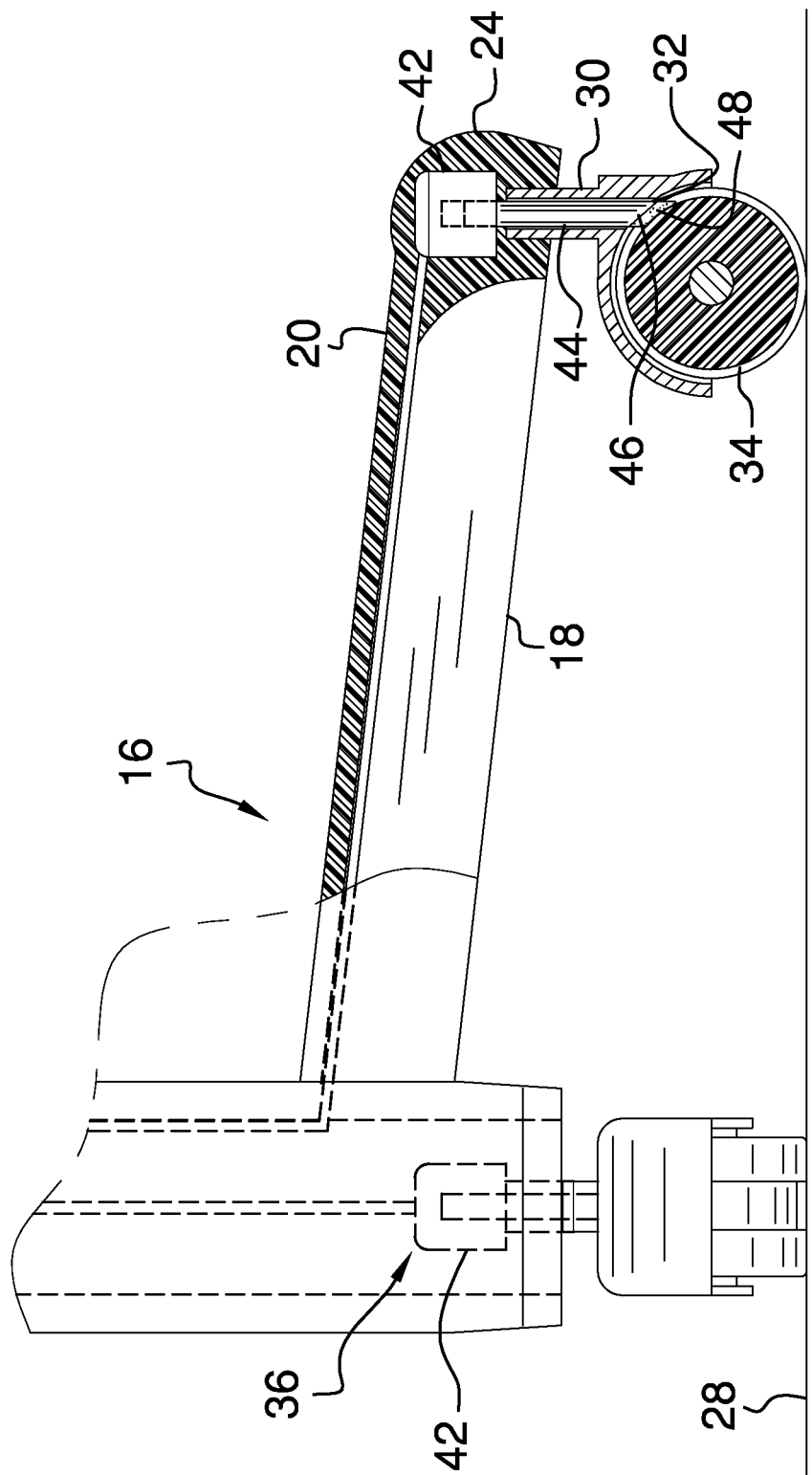
FIG. 3 is a cross sectional view taken along line 3-3 of FIG. 2 of an embodiment of the disclosure.
Figure 4:
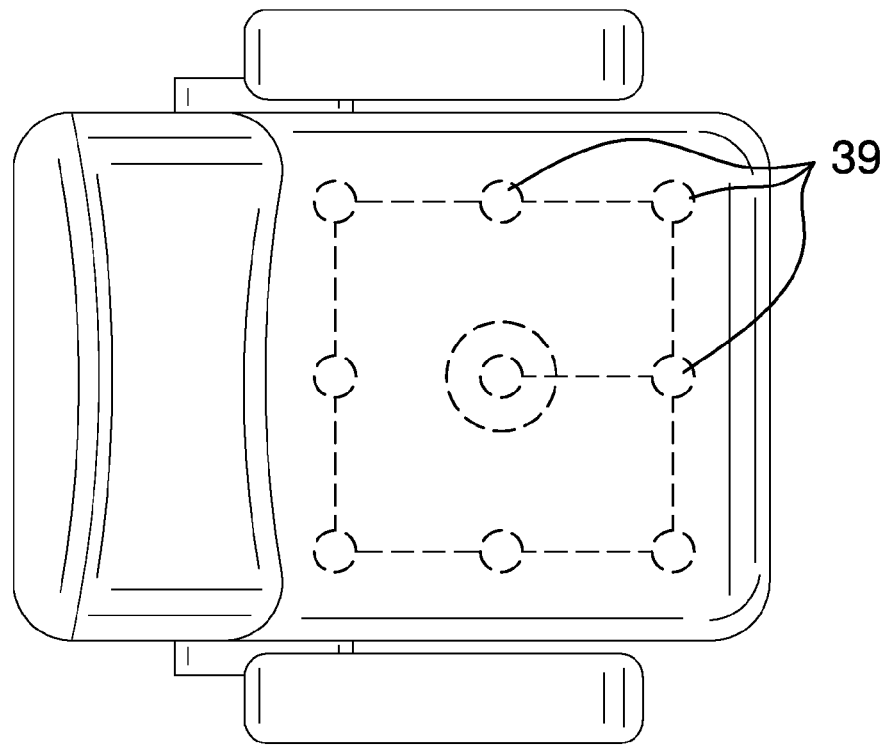
FIG. 4 is a top view of an embodiment of the disclosure.
Figure 5:
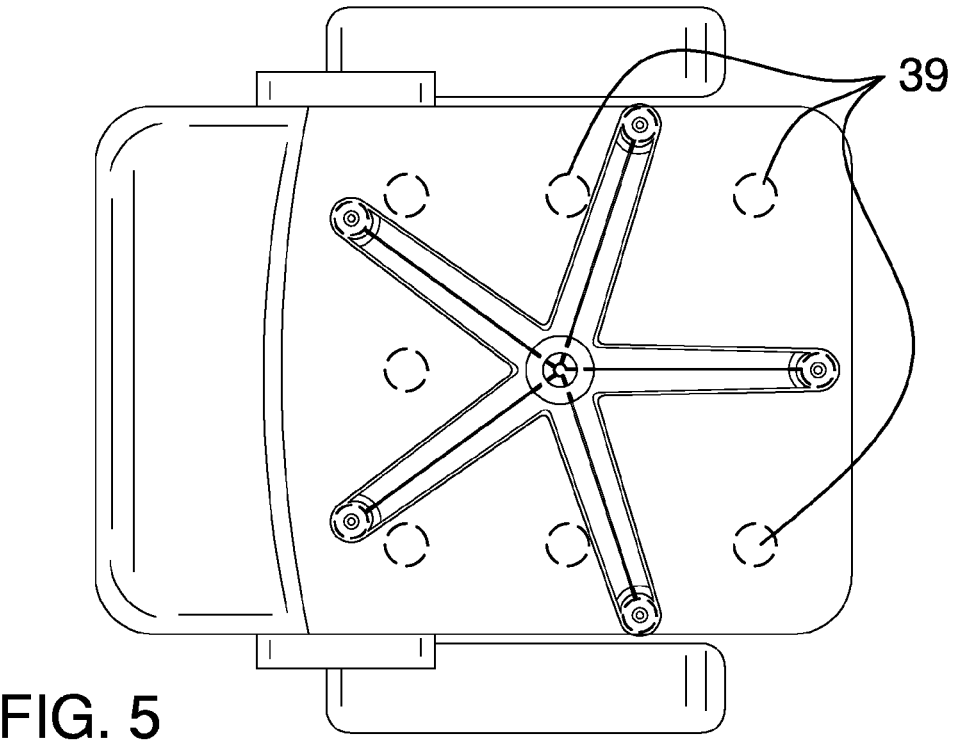
FIG. 5 is a bottom view of an embodiment of the disclosure.

With reference now to the drawings, and in particular to FIGS. 1 through 5 thereof, a new lock device embodying the principles and concepts of an embodiment of the disclosure and generally designated by the reference numeral 10 will be described.

As best illustrated in FIGS. 1 through 5, the chair lock system 10 generally comprises a chair 12 that has a seat 14 and a base 16. The base 16 has a bottom side 18. The base 16 may comprise a plurality of arms 20 extending outwardly from a column 22. Each of the arms 20 may have a distal end 24 with respect to the column 22. The chair 12 may comprise an office chair or the like and the seat 14 may be comprised of a resiliently compressible material.

A plurality of wheels 26 is provided. Each of the wheels 26 is rotatably coupled to the chair 12 and each of the wheels 26 may roll along a support surface 28. The support surface 28 may comprise a floor or the like. Each of the wheels 26 is positioned on the bottom side 18 of the base 16. Each of the wheels 26 may be positioned on the distal end 24 of an associated one of the arms 20.

Each of the wheels 26 comprises a tube 30 that rotatably engages the bottom side 18 of the base 16. The tube 30 extends downwardly from the bottom side 18. The tube 30 has a distal end 32 with respect to the bottom side 18 and the distal end 32 is open. A roller 34 is rotatably coupled to the distal end 32 of the tube 30. Thus, the roller 34 may roll along the support surface 28.

A locking unit 36 is provided and the locking unit 36 is coupled to the chair 12. The locking unit 36 inhibits the wheels 26 from rolling along the support surface 28 when the chair 12 is sat upon. The locking unit 36 comprises a processor 38 that is coupled to the chair 12. The processor 36 may comprise an electronic processor or the like.

A plurality of pressure sensors 39 is provided and each of the pressure sensors 39 is positioned within the seat 14. Thus, each of the pressure sensors 39 detects when the seat 14 is sat upon. Each of the pressure sensors 39 is electrically coupled to the processor 36. The processor 36 generates a locking sequence when the seat 14 is sat upon. Each of the pressure sensors 39 may comprise an electrical pressure sensor or the like. Each of the pressure sensors 39 may have an operational range ranging between approximately four kg and one hundred eighty kg.

A speaker 40 is coupled to the chair 12 and the speaker 40 is electrically coupled to the processor 36. The speaker 40 emits an audible alarm when the processor 36 generates the locking sequence. The speaker 40 emits the audible alarm for a predetermined duration of time. The predetermined duration of time may range between approximately five seconds and ten seconds.

A plurality of actuators 42 is provided and each of the actuators 42 is positioned within the base 16. Each of the actuators 42 is aligned with an associated one of the wheels 26. Each of the actuators 42 is electrically coupled to the processor 36 such that the processor 36 turns each of the actuators 42 on and off. Each of the actuators 42 may be positioned adjacent to the distal end 24 corresponding to each of the arms 20.

A plurality of shafts 44 is provided and each of the shafts 44 is movably coupled to an associated one of the actuators 42. Each of the shafts 44 extends downwardly through the tube 30 corresponding to an associated one of the wheels 26. Each of the shafts 44 has a distal end 46 with respect to the associated actuator 42. The distal end 46 of each of the shafts 44 may be sloped and a pad 48 may be coupled to the distal end 46 of each of the shafts 44.

Each of the actuators 42 urges the associated shaft 44 downwardly in the tube 30 when the processor 36 generates the locking sequence. The distal end 46 of each of the shafts 44 frictionally engages the roller 34 corresponding to the associated wheel 26. Thus, each of the shafts 44 inhibits the wheels 26 from rolling along the support surface 28 when the chair 12 is sat upon. A power supply 50 is coupled to the chair 12 and the power supply 50 is electrically coupled to the processor. The power supply 50 comprises at least one battery.

In use, each of the actuators 42 urges the associated shaft 44 downwardly in the tube 30 when the seat 14 is sat upon. The distal end 46 of each of the shafts 44 frictionally engages roller 34 corresponding to the associated wheel 26. Thus, the chair 12 is inhibited from rolling while the chair 12 is occupied. The speaker 40 emits the audible alarm when the seat 14 is sat upon. Each of the actuators 42 urges the associated shaft 44 upwardly in the tube 30 when the seat 14 is unoccupied. Thus, each of the wheels 26 may freely roll along the support surface 28.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A chair lock system comprising:
    a chair, said chair having a seat and a base, said base having a bottom side;
    a plurality of wheels being rotatably coupled to said chair wherein each of said wheels is configured to roll along a support surface, each of said wheels being positioned on said base, each of said wheels comprising a tube rotatably engaging said bottom side such that said tube extends downwardly from said bottom side, said tube having a distal end with respect to said bottom side, said distal end being open, each of said wheels further including a roller being rotatably coupled to said distal end wherein said roller is configured to roll along the support surface;
    a locking unit being coupled to said chair wherein said locking unit is configured to inhibit said wheels from rolling along the support surface when said chair is sat upon, said locking unit comprising
        a processor being coupled to said chair, and
        a plurality of pressure sensors, each of said pressure sensors being positioned within said seat wherein each of said pressure sensors is configured to detect when said seat is sat upon, each of said pressure sensors being electrically coupled to said processor such that said processor generates a locking sequence when said seat is sat upon;
    a plurality of actuators, each of said actuators being positioned within said base, each of said actuators being aligned with an associated one of said wheels, each of said actuators being electrically coupled to said processor such that said processor turns said actuators on and off;
    a plurality of shafts, each of said shafts being movably coupled to an associated one of said actuators, each of said shafts extending downwardly through said tube corresponding to an associated one of said wheels, each of said shafts having a distal end with respect to said associated actuator; and
    wherein each of said actuators urges said associated shaft downwardly in tube when said processor generates said locking sequence, said distal end of each of said shafts frictionally engaging said roller corresponding to said associated wheel wherein each of said shafts is configured to inhibit said wheels from rolling along the support surface.

2. The system according to claim 1, further comprising a speaker being coupled to said chair, said speaker being electrically coupled to said processor, said speaker emitting an audible alarm when said processor generates said locking sequence.

3. The system according to claim 1, further comprising a power supply being coupled to said chair, said power supply being electrically coupled to said processor, said power supply comprising at least one battery.

4. A chair lock system comprising:
    a chair having a seat and a base, said base having a bottom side;
    a plurality of wheels being rotatably coupled to said chair wherein each of said wheels is configured to roll along a support surface, each of said wheels being positioned on said bottom side of said base, each of said wheels comprising:
        a tube rotatably engaging said bottom side such that said tube extends downwardly from said bottom side, said tube having a distal end with respect to said bottom side, said distal end being open, and
        a roller being rotatably coupled to said distal end wherein said roller is configured to roll along the support surface; and
    a locking unit being coupled to said chair wherein said locking unit is configured to inhibit said wheels from rolling along the support surface when said chair is sat upon, said locking unit comprising:
        a processor being coupled to said chair,
        a plurality of pressure sensors, each of said pressure sensors being positioned within said seat wherein each of said pressure sensors is configured to detect when said seat is sat upon, each of said pressure sensors being electrically coupled to said processor such that said processor generates a locking sequence when said seat is sat upon,
        a speaker being coupled to said chair, said speaker being electrically coupled to said processor, said speaker emitting an audible alarm when said processor generates said locking sequence,
        a plurality of actuators, each of said actuators being positioned within said base, each of said actuators being aligned with an associated one of said wheels, each of said actuators being electrically coupled to said processor such that said processor turns said actuators on and off,
        a plurality of shafts, each of said shafts being movably coupled to an associated one of said actuators, each of said shafts extending downwardly through said tube corresponding to an associated one of said wheels, each of said shafts having a distal end with respect to said associated actuator, each of said actuators urging said associated shaft downwardly in said tube when said processor generates said locking sequence, said distal end of each of said shafts frictionally engaging said roller corresponding to said associated wheel wherein each of said shafts is configured to inhibit said wheels from rolling along the support surface, and a power supply being coupled to said chair, said power supply being electrically coupled to said processor, said power supply comprising at least one battery.

* * * * *